United States Patent [19]
Tomita et al.

[11] Patent Number: 5,253,537

[45] Date of Patent: Oct. 19, 1993

[54] MAGNETIC FLOW METER

[75] Inventors: Toyofumi Tomita; Toshihiko Okamoto, both of Tokyo, Japan

[73] Assignee: Kabushiki Kaisha Toshiba, Kawasaki, Japan

[21] Appl. No.: 787,141

[22] Filed: Nov. 4, 1991

[30] Foreign Application Priority Data

Nov. 6, 1990 [JP] Japan ................... 2-300185

[51] Int. Cl.⁵ .............................................. G01F 1/60
[52] U.S. Cl. ................. 73/861.17; 73/861.15
[58] Field of Search ........... 73/861.11, 861.12, 861.13, 73/861.14, 861.16, 861.17, 146.4, 151, 155; 340/870.38, 606, 870.16, 870.17, 870.29; 330/308; 250/214 A

[56] References Cited

U.S. PATENT DOCUMENTS 3,999,443 12/1976 Appel et al. .
4,103,292 7/1978 Haas .................................. 340/606
4,147,058 4/1979 Matsushita .
4,357,835 11/1982 Kayama ........................... 73/861.17
4,513,624 4/1985 McHale et al. .

OTHER PUBLICATIONS

Bopp & Reuther, Magnetic-Inductive Standard Frequency Field with Preamplifier, Type MDM-NFV, Jul. 1988.

*Primary Examiner*—Richard E. Chilcot, Jr.
*Assistant Examiner*—R. Biegel
*Attorney, Agent, or Firm*—Oblon, Spivak, McClelland, Maier & Neustadt

[57] ABSTRACT

A magnetic flow meter according to this invention is composed of a sensor for sensing a flow rate of a fluid and a converter connected to the sensor via a signal cable. The sensor essentially consists of a measuring tube through which the fluid flows, a pair of opposed electrodes installed in the measuring tube so as to face each other, an exciting coil for generating a magnetic field and applying it to the measuring tube in a direction perpendicular to the centerline of the measuring tube, and a current signal transmitting circuit for converting a differential voltage across the pair of electrodes into a corresponding current signal. The converter is made up of a signal cable one end of which is connected to the current signal transmitting circuit and which transmits the current signal from the current signal transmitting circuit, and a converter to which the other end of the signal cable is connected and which converts the current signal transmitted over the signal cable into a flow signal representing the flow rate through the measuring tube.

11 Claims, 2 Drawing Sheets

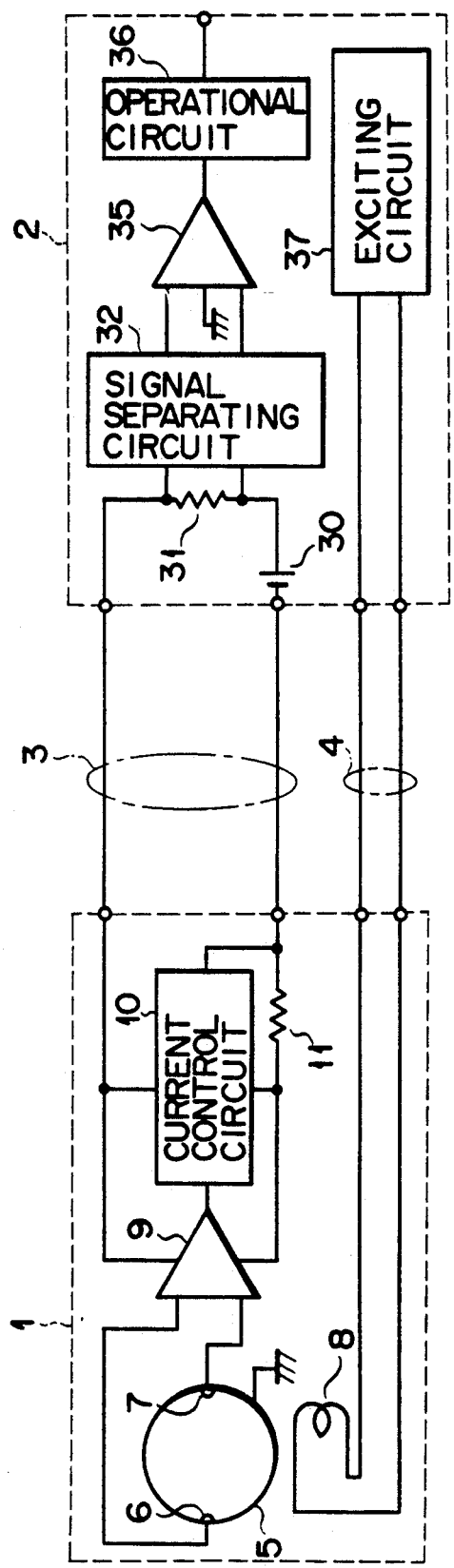
F I G. 1
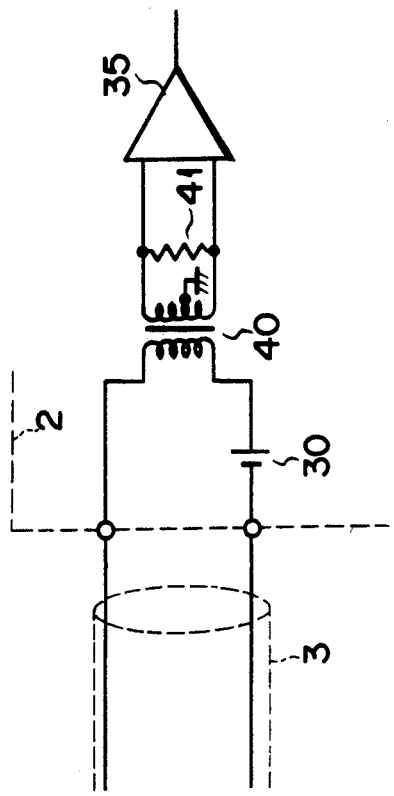
F I G. 3

MAGNETIC FLOW METER

BACKGROUND OF THE INVENTION

1. Field of the Invention

This invention relates to a flow meter, and more particularly to a magnetic flow meter composed of a sensor for producing a voltage signal proportional to the flow rate of liquid flowing through the measuring tube and a converter for converting the output signal of the sensor into the measured value of flow rate, with the converter being installed sufficiently away from the sensor.

2. Description of the Related Art

Widely known magnetic flow meters are generally made up of a sensor and a converter with a signal cable connecting them with each other. The sensor is provided with a measuring tube through which a fluid to be measured flows and a exciting coil that generates a magnetic field across the measuring tube. The measuring tube is provided with a pair of electrodes facing each other across the tube.

With a liquid flowing through the measuring tube, the sensor produces a differential voltage across a pair of the electrodes proportional to the flow rate, when an electric field generated by the exciting coil is applied to the measuring tube.

The converter is provided with an amplifier to which the differential voltage across the electrodes of the sensor is applied via a signal cable. It obtains a flow rate by processing the differential voltage amplified at the amplifier. It is also provided with an exciting circuit that supplies exciting current to the exciting coil of the sensor.

The sensor is separated from the converter to prevent the sensor from being installed in a poor maintenance environment such as inside the pit. It is desirable that the sensor should be placed where maintenance can be easily done.

For example, when the sensor is installed in an area of an explosion-proof atmosphere, the converter is placed in a safe area. In this case, it is difficult to secure a safe area of, for example, the order of some 10 $m^2$ meters to install the converter in an explosion-proof atmosphere. This makes the separating distance between the sensor and the converter as long as from 300 to 1000 m or more.

The cable for transmitting a voltage signal to a remote place is made up of conducting wires wrapped with an insulating film and then covered with a shielding tube. Because a floating capacitance and an insulating resistance exit between the conducting wires and shielding tube, as the signal cable to transmit the differential voltage across the electrodes of the sensor to the converter becomes longer, the floating capacitance of the cable increases, which makes the cable impudance seen from the electrodes smaller. The longer cable also decreases the insulating resistance of the signal cable. Therefore, the length of the cable is limited by the capacitance and resistance of the cable.

For example, with a fluid conductivity of 5 $\mu$/cm, the length of the cable is limited to approximately 30 m, which is not long enough to separate the sensor from the converter.

SUMMARY OF THE INVENTION

The object of the present invention is to provide a magnetic flow meter that secures a signal cable length enough to connect a sensor to a converter with a sufficient distance between them without being affected by the floating capacitance and insulating resistance of the cable.

The foregoing object is accomplished by providing a magnetic flow meter comprising a sensor that is composed of a measuring tube through which a fluid flows, a pair of electrodes installed in the measuring tube so as to face each other, an exciting coil for generating a magnetic field and applying it to the measuring tube, and a current control circuit for converting the differential voltage across the pair of electrodes into a current signal proportional to the differential voltage, a signal cable one end of which is connected to the current control circuit and which transmits the current signal from the current control circuit, and a converter to which the other end of the signal cable is connected and which converts the current signal transmitted over the signal cable into a flow signal representing the flow rate through the measuring tube.

With this configuration, in the sensor, when a magnetic field generated at the exciting coil is applied to the measuring tube through which a fluid is flowing, a differential voltage appears across the electrodes installed in the measuring tube so as to face each other and the current proportional to the differential voltage is supplied. The current flows through the signal cable and enters the converter, which then separates from the current signal a signal proportional to the differential voltage across the electrodes and obtains the flow rate through the measuring tube.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a circuit diagram for a magnetic flow meter according to an embodiment of the present invention;

FIG. 3 is a circuit diagram for an important part of a modification of the embodiment.

DETAILED DESCRIPTION OF THE PREFERRED EMBODIMENTS

Figure 2:
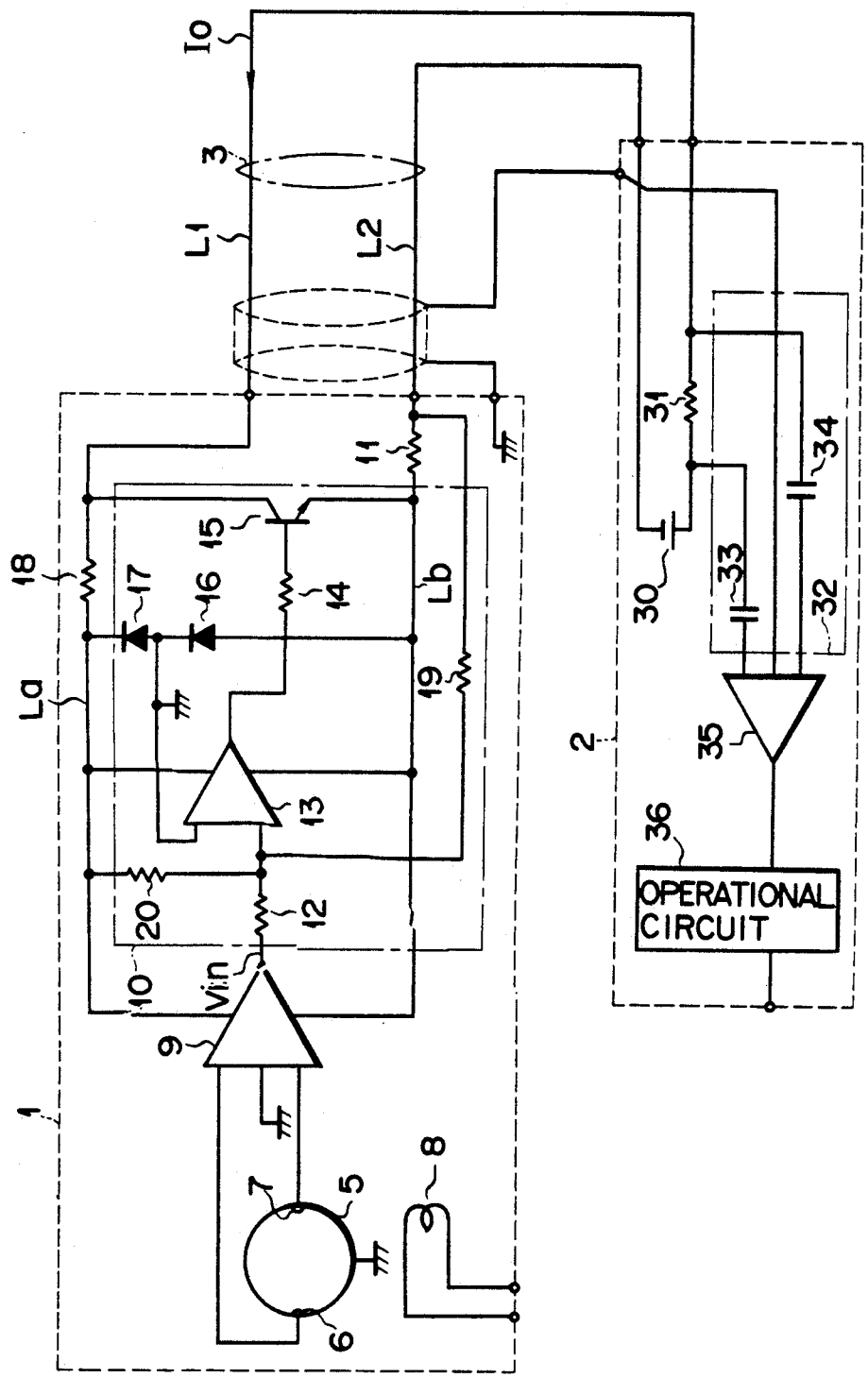
FIG. 2 is a detailed circuit diagram for the magnetic flow meter of FIG. 1.

A magnetic flow meter according to an embodiment of the present invention will be explained, referring to the accompanying drawings.

FIG. 1 is a circuit diagram of a magnetic flow meter according to an embodiment of the present invention. The magnetic flow meter is composed of a sensor 1 and a converter 2 with a signal cable 3 and an exciting cable 4 connecting the sensor 1 to the converter 2.

The sensor 1 is provided with a measuring tube 5 through which a fluid to be measured flows. On the inside walls of the measuring tube 5, electrodes 6 and 7 are provided so as to face each other across the tube. An exciting coil 8 is provided so as to face the measuring tube 5. The exciting coil 8 produces a magnetic fields perpendicular to the direction of fluid flow and the tube diameter on which the electrodes 6 and 7 exist.

The electrode 6 and 7 are connected to the inputs of a preamplifier 9. The output terminal of the preamplifier 9 is connected to a current control circuit 10.

The current control circuit 10 receives a current, which is sensed by a current sensing resistance 11 and flows through the signal cable 3, and controls the current so that it may be proportional to the differential voltage across the electrodes 6 and 7.

Referring to FIG. 2, which is a detailed circuit diagram of the magnetic flow meter, the arrangements of the current control circuit 10 and converter 2 will be described.

The output terminal of the preamplifier 9 is connected to one input terminal of an operational amplifier 13 via a resistor 12. The output of the operational amplifier 13 is connected to the base of an n-p-n transistor 15 via a resistor 14. The n-p-n transistor 15 has its collector connected to one power line La, which is connected to a first signal line L1 of the signal cable 3, and its emitter connected to the other power line Lb, which is connected to a second signal line L2 of the signal cable 3. The other power line Lb is connected to one end of the second signal line L2 via the current sensing resistor 11.

Between the power lines or between the emitter and collector of the transistor 15, a series circuit of a first and a second Zener diode 16 and 17 is connected. The cathode of the first Zener diode 16 (the junction point of the first and second Zener diodes 16 and 17) is connected to the other input terminal of the operational amplifier 13 while the cathode of the second Zener diode 17 is connected to the collector of the transistor 15 via a resistance 18 inserted into the power line La.

The signal cable-side end of the current sensing resistor 11 is connected to one input terminal of the operational amplifier 13 via a resistor 19 to feed back the voltage across the current sensing resistor 11 to one input terminal of the operational amplifier 13.

In addition, one input terminal of the operational amplifier 13 is connected to one power line La via a resistor 20.

On the other hand, the converter 2 is provided with a power supply 30 and a signal sensing resistor 31. The power supply 30 and signal sensing resistor 31 are connected to the signal cable 3. Specifically, the other end of the first signal line L1 of the signal cable 3 is connected to one end of the signal sensing resistor 31; the other end of the second signal line L2 is connected to the negative terminal of the power supply 30; and the positive terminal of the power supply 30 is connected to the other end of the signal sensing resistor 31.

The signal sensing resistor 31 is connected to a signal separating circuit 32, which separates from the voltage across the signal sensing resistor 31 a voltage proportional to the differential voltage between the electrodes 6 and 7.

Specifically, the signal separating circuit 32, as shown in FIG. 2, is composed of capacitors 33 and 34. The signal separating circuit 32 is connected via an amplifier 35 to an operational circuit 36, which receives the voltage separated at the signal separating circuit 32 to produce a flow signal representing the flow rate through the measuring tube 5.

The converter 2 is also provided with an exciting circuit 37. The exciting circuit 37, which generates a square-wave exciting current, is connected to the exciting coil 8 of the sensor 1 via an exciting cable 4 (not shown in FIG. 2).

The operation of the embodiment thus constructed will now be described.

The output current of the power supply 30 flows through the current sensing resistor 31 and the signal cable 3 and then is supplied to the sensor 1. In the sensor 1, the output current from the power supply flows through the resistor 18, Zener diodes 16 and 17, and resistor 11. The voltages derived across the Zener diodes 16 and 17 are then applied to the preamplifier 9 and operational amplifier 13, thereby causing them to operate. On the other hand, the exciting circuit 37 of the converter 2 supplies an exciting current to the exciting coil 8 via the exciting cable 4, which causes the exciting coil 8 to generate a magnetic field across the measuring tube 5.

Under these conditions, when a fluid flows through the measuring tube 5, an electromotive force is generated across the electrodes 6 and 7 according to Faraday's law of electromagnetic induction. The electromotive force is proportional to the average flow rate velocity of fluid and the intensity of magnetic field. The electromotive force is transmitted to the preamplifier 9, which amplifies the differential voltage $V_{in}$ across the electrodes 6 and 7 and supplies it.

Because the exciting current to the exciting coil 8 is of a square wave, the differential voltage $V_{in}$ is also of a square wave with the ground potential as a reference. The differential voltage $V_{in}$ is supplied to one input terminal of the operational amplifier 13, which applies via the resistor 14 to the base of the n-p-n transistor 15 the deviation voltage of the differential voltage $V_{in}$ from the Zener voltage derived at the Zener diode 16. Then, the collector current of the n-p-n transistor 15 varies with the differential voltage $V_{in}$. The collector current is supplied as the current signal representing the differential voltage $V_{in}$.

As a consequence, the signal cable 3 carries a current $I_o$ proportional to the differential voltage $V_{in}$ across the electrodes 6 and 7. The current $I_o$ is represented as:

$$I_o = R17 \cdot VZ18/R11 \cdot R20 - VZ19/R11 + R17 \cdot V_{in}/R11 \cdot R12$$

where R11, R12, R19, and R20 are the resistances of the resistors 11, 12, 19, and 20, respectively, and VZ18 and VZ19 are the Zener voltages of the Zener diodes 18 and 19, respectively.

The resistances of the resistors 11, 12, 19, and 20 are set so that even if the current $I_o$ decreases to a minimum, the Zener voltages applied to the preamplifier 9 and operational amplifier 13 may be maintained at a level that allows these amplifiers 9 and 13 operate properly.

The current $I_o$ flows through the signal cable 3 and then through the current sensing resistor 31 of the converter 2. Across the current sensing resistor 31, a voltage appears in proportion to the current $I_o$. The voltage has its direct-current component blocked off with the capacitors 33 and 34 to separate a voltage proportional to the differential voltage $V_{in}$. The separated voltage is supplied via the capacitors 33 and 34 to the amplifier 35, which then amplifies it. Receiving the amplified voltage, the operational circuit 36 produces the flow signal.

As noted above, in the embodiment, the differential voltage across the electrodes 6 and 7 of the measuring tube 5 is converted into the current $I_o$ according to the differential voltage and then the converted current $I_o$ is transmitted via the signal cable 3 to the converter 2, which from the current signal the signal proportional to the differential voltage across the electrodes 6 and 7 and then obtains the rate of flow through the measuring tube 5.

As a result, the impedance of the signal cable 3 becomes nearly equal to the resistance of the resistor 31, which reduces the impedance significantly. The output impedance across the electrodes 6 and 7 will be as high as several megaohms when the conductivity of the fluid is low. However, the resistance of the resistor 31 can be set to as low as 10 Ω, so that the signal cable extending over as long as several kilometers will not be affected by the floating capacitance and insulating resistance of the cable.

In addition, the low-impedance signal cable 3 achieves a long-distance transmission with low noise. Therefore, a longer distance between the sensor 1 and converter 2 has a less adverse effect on the transmission due to the floating capacitance and insulating resistance of the cable 3, which puts much fewer restrictions on where to install the magnetic flow meter.

Because there are almost no restrictions on the earth capacity and insulating resistance, inexpensive cables may be used for the signal cable 3. The signal cable 3 has the same number of conducting wires as that of a conventional equivalent, so that the existing cables may be used, thereby reducing the cost.

The present invention is not limited to the abovementioned embodiment, and may be practiced or embodied in still other ways without departing from the spirit or essential character thereof.

For example, the separating circuit contained in the converter 2 to separate the differential voltage may be constructed as shown FIG. 3. In this separating circuit, the signal cable 3 is connected to a current transformer 40 whose secondary coil is connected to a resistor 41. The resistor 41 is connected across the inputs terminal of the amplifier 35.

With such an arrangement, the ground of the sensor 1 and that of the converter 2 are insulated from each other and connected independently to the earth, thereby reducing the introduction of noises into the circuit.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic flow meter comprising:
   flow rate sensing means which includes a measuring tube through which a fluid flows, a pair of opposed electrodes installed in said measuring tube, exciting means, including a magnetic coil provided adjacent said measuring tube, for generating a magnetic field in a direction perpendicular to a centerline of said tube and between said electrodes and applying it to said measuring tube, and current signal transmitting means for converting a differential voltage across said pair of electrodes into a current signal proportional to the differential voltage;
   an operational amplifier means which has one input terminal supplied with said differential voltage and the other input terminal supplied with a constant voltage and produces a base signal having a voltage corresponding to a difference between said differential voltage and said constant voltage.
   a signal cable one end of which is connected to said current signal transmitting means and which transmits said current signal from said current signal transmitting means; and
   converting means to which the other end of said signal cable is connected and which converts said current signal transmitted over said signal cable into a flow signal representing a flow rate through said measuring tube.

2. A magnetic flow meter according to claim 1, wherein said current signal transmitting means includes a preamplifier for sensing the differential voltage across said pair of electrodes, and a transistor having a base and a collector-emitter path through which a current flows when the base is supplied with the base signal, said current being supplied to said signal cable as said current signal.

3. A magnetic flow meter according to claim 1, wherein said converting means includes a signal sensing resistor which is connected to the other end of said signal cable and converts said current signal flowing through said signal cable into a voltage, a.c. signal coupling means for coupling an a.c. voltage proportional to said differential voltage from said voltage across said signal sensing resistor, and converting operation means for converting into said flow signal the a.c. voltage proportional to said differential voltage.

4. A magnetic flow meter according to claim 1, wherein said converting means includes a current transformer having a primary-side coil and a secondary-side coil with the primary-side coil being connected to the other end of said signal cable, a resistor connected across the secondary-side coil of said current transformer for generating a voltage proportional to said differential voltage, an amplifier to which the voltage derived across said resistor is applied, and conversion operation means for converting an output of said amplifier into said flow signal.

5. A magnetic flow meter according to claim 1, wherein:
   said current signal transmitting means includes a preamplifier for sensing the differential voltage across said pair of electrodes, and a transistor having a base and a collector-emitter path through which a current flows when the base is supplied with the base signal, said current being supplied to said signal cable as said current signal;
   said converting means includes a power supply for applying a constant voltage to said signal cable, a signal sensing resistor which is connected via said power supply to the other end of said signal cable and converts the current signal flowing through said signal cable into a voltage, a.c. signal coupling means for coupling an a.c. a voltage proportional to said differential voltage from said voltage across said signal sensing resistor, and converting operation means for converting into said flow signal, the a.c. voltage proportional to said differential voltage; and
   said signal cable includes a first signal line which has one end connected to a collector of said transistor and the other end connected to one end of said signal sensing resistor and a second signal line which has one end connected to an emitter of said transistor and the other end connected to one electrode of said power supply.

6. A magnetic flow meter according to claim 1, wherein:

said current signal transmitting means includes a preamplifier for sensing the differential voltage across said pair of electrodes, and a transistor having a base and a collector-emitter path through which a current flows when the base is supplied with the base signal, said current being supplied to said signal cable as said current signal;

said converting means includes a power supply for applying a constant voltage to said signal cable, a current transformer having a primary-side coil and a secondary-side coil with the primary-side coil being connected to the other end of said signal cable, a resistor connected across the secondary-side coil of said current transformer for generating a voltage proportional to said differential voltage, an amplifier to which the voltage derived across said resistor is applied, and conversion operation means for converting an output of said amplifier into said flow signal; and said signal cable includes a first signal line which has one end connected to a collector of said transistor with the other end connected to one end of the primary-side coil of said current transformer and a second signal line which as one end connected to an emitter of said transistor and the other end connected to one electrode of said power supply.

7. A magnetic flow meter according to claim 2, wherein said current controlling means has a series circuit of first and second Zener diodes connected in a forward direction between a collector and emitter of said transistor, a junction point of said first and second Zener diodes being connected to the other input terminal of said operational amplifier means and a voltage of the junction point maintained at a constant voltage by said first and second Zener diodes being applied to the other input terminal of said operational amplifier.

8. A magnetic flow meter according to claim 2, wherein said current signal transmitting means further comprises a feedback circuit in which a emitter of said transistor is connected to one input terminal of said operational amplifier means.

9. A magnetic flow meter according to claim 3, wherein said a.c. coupling means includes a first capacitor one end of which is connected to one end of said signal sensing resistor, a second capacitor one end of which is connected to the other end of said signal sensing resistor, and an amplifier having a first input terminal connected to the other end of the first capacitor, a second input terminal connected to the other end of said second capacitor, and an output terminal from which a voltage obtained by amplifying a voltage across said first and second input terminals is supplied.

10. A magnetic flow meter according to claim 5, wherein said current signal transmitting means has a series circuit of a first and second Zener diodes connected in a forward direction between the collector and emitter of said transistor, a junction point of said first and second Zener diodes being connected to the other input terminal of said operational amplifier means.

11. A magnetic flow meter comprising:

flow rate sensing means which includes a measuring tube through which a fluid flows, exciting means including a magnetic coil provided adjacent said tube for generating a magnetic field in a direction perpendicular to a centerline of said tube and applying it to said measuring tube, detecting means for detecting a voltage in the fluid induced by the magnetic field, and current signal transmitting means for converting the voltage detected by said detecting means into a current signal proportional to the voltage;

an operational amplifier means which has one input terminal supplied with said differential voltage and the other input terminal supplied with a constant voltage and produces a base signal having a voltage corresponding to a difference between said differential voltage and said constant voltage, a signal cable means, connected to said current signal transmitting means, for transmitting said current signal from said current signal transmitting means; and converting means, connected to said signal cable, for converting said current signal transmitted through said signal cable into a flow signal representing a flow rate of the fluid flowing through said measuring tube.

* * * * *